Sept. 23, 1958 S. T. MILES ET AL 2,852,809
DEVICE FOR MOLDING PLASTIC MATERIAL
Filed April 3, 1956 7 Sheets-Sheet 1

INVENTORS
Stephen T. Miles
BY William T. La Rose
ATTORNEYS

Fig. 2

INVENTORS
Stephen T. Miles
William T. La Rose
BY
ATTORNEYS

Sept. 23, 1958  S. T. MILES ET AL  2,852,809
DEVICE FOR MOLDING PLASTIC MATERIAL
Filed April 3, 1956  7 Sheets-Sheet 3

INVENTORS
Stephen T. Miles
BY  William T. La Rose
ATTORNEYS

Sept. 23, 1958 S. T. MILES ET AL 2,852,809
DEVICE FOR MOLDING PLASTIC MATERIAL
Filed April 3, 1956 7 Sheets-Sheet 4

INVENTORS
Stephen T. Miles
BY William T. LaRose

ATTORNEYS

Sept. 23, 1958  S. T. MILES ET AL  2,852,809
DEVICE FOR MOLDING PLASTIC MATERIAL

Filed April 3, 1956  7 Sheets—Sheet 5

INVENTORS
Stephen T. Miles
BY William T. LaRose

ATTORNEYS

United States Patent Office 2,852,809
Patented Sept. 23, 1958

2,852,809

DEVICE FOR MOLDING PLASTIC MATERIAL

Stephen T. Miles, Hoosick Falls, and William T. La Rose, Troy, N. Y.

Application April 3, 1956, Serial No. 575,729

2 Claims. (Cl. 18—17)

Our invention relates to the art of molding and particularly to devices for molding plastic material which must be heated to molding temperatures before it can be formed to the desired shape in the mold.

One of the objects of our invention is to provide a device of this character which is entirely automatic in operation, and in which the molding material in finely divided form is deposited by gravity in measured volumes from a supply thereof into a plurality of cups which convey it to and deposit it in molds of the desired shape in which it is then subjected to pressure to form the molded articles. The cups are then automatically returned to their initial positions for refilling and a repetition of the molding cycle.

A further object is to provide a device of this character in which articles of different size may be molded and in which the quantity of material which is received from the supply thereof by the cups may be adjusted according to the volume required in the finished articles.

A further object is to provide a device of this character in which the material to be molded is carried in measured quantities to a heater where it is automatically heated to the required temperature and then automatically deposited in the molds and automatically subjected to pressure in order to form the articles.

We accomplish these and other objects which will be apparent as the description proceeds by the means described below and illustrated in the accompanying drawings, in which—

Figure 1:
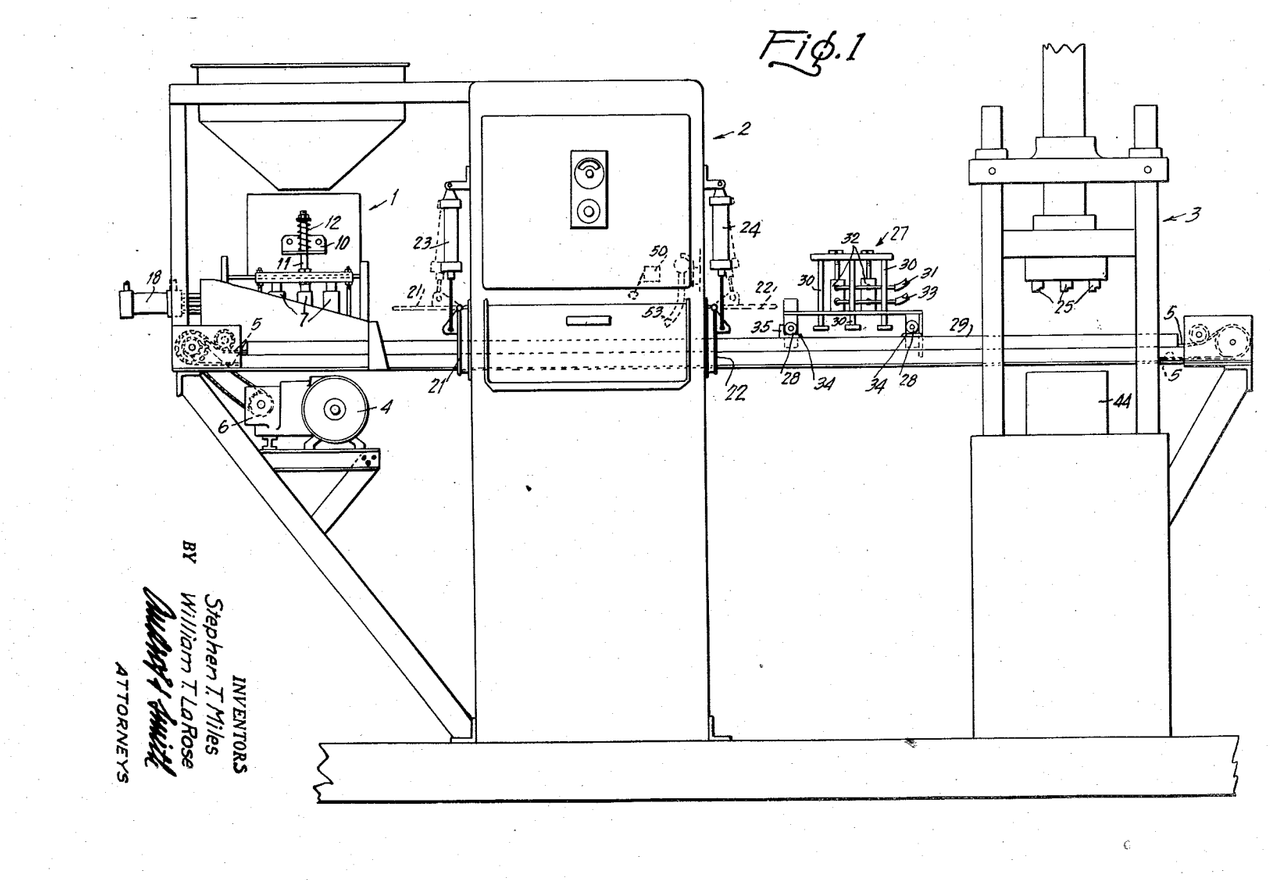
Fig. 1 is a more or less diagrammatic side elevation view of our automatic molding machine showing the press plungers in an intermediate position.

Referring to the drawings, and first to Fig. 1, 1 represents generally the hopper which carries the supply of molding compound; 2 represents generally the heating device and 3 represents the press. 4 is a reversible motor which drives chains 5 longitudinally along each side of the machine through suitable speed reducing mechanism, represented generally by the numeral 6, and which serve to convey the compound-carrying device from the hopper to the molds and press and back to the hopper.

Referring now more particularly to Figs. 7, 8, 9 and 10, 1 is the hopper from which the compound is deposited in measuring units 7 which are telescopic tubes so that their carrying capacity may be varied depending upon the quantity of compound required for the molded articles. As illustrated, there are nine of these measuring units, but it is to be understood that any number may be employed.

Figure 7:
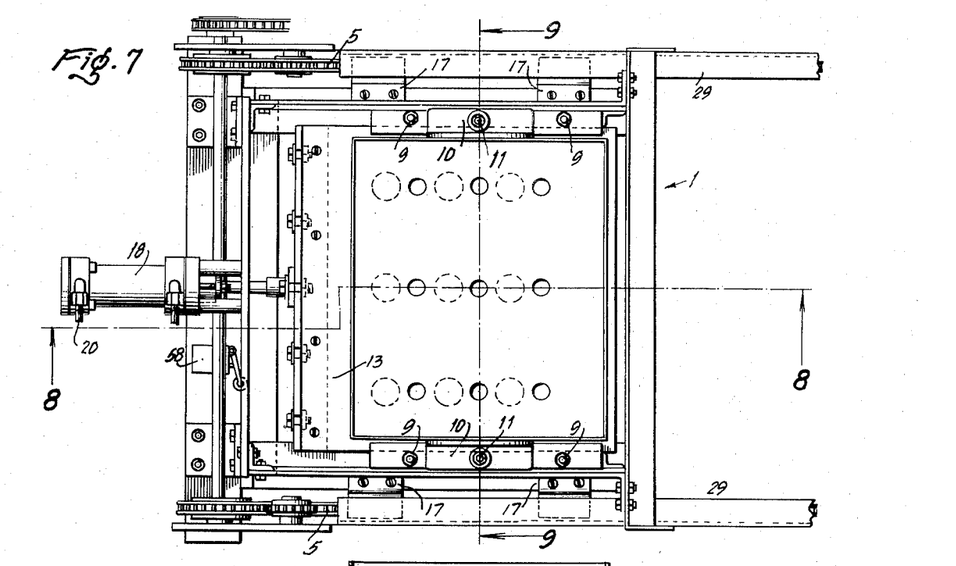
Fig. 7 is a plan view of the hopper which holds the supply of molding compound and which is located at the left end of our machine, as illustrated in the drawings.
Figure 8:
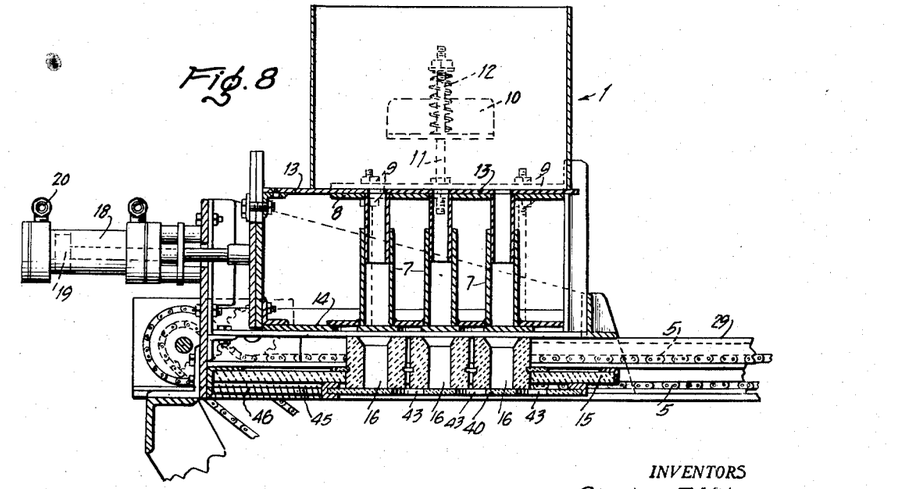
Fig. 8 is a section of Fig. 7 in the plane 8—8.
Figure 9:
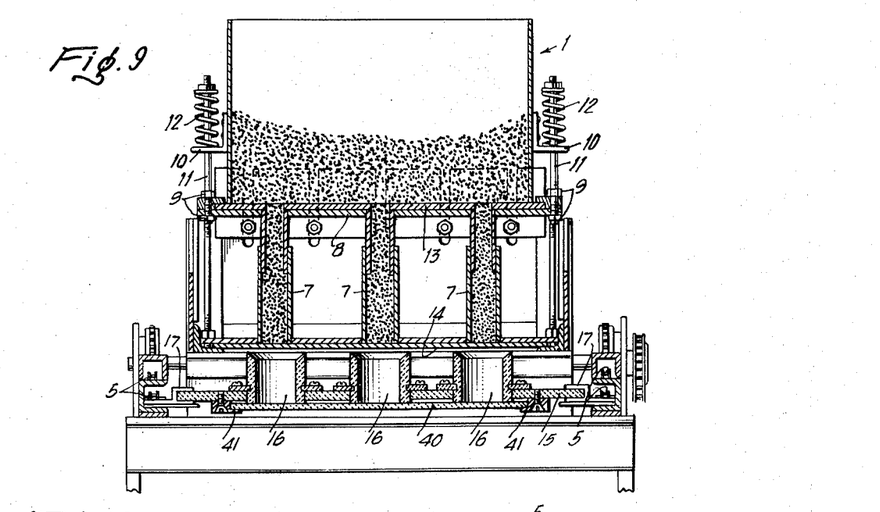
Fig. 9 is a section of Fig. 7 in the plane 9—9 showing molding compound in the hopper.
Figure 10:
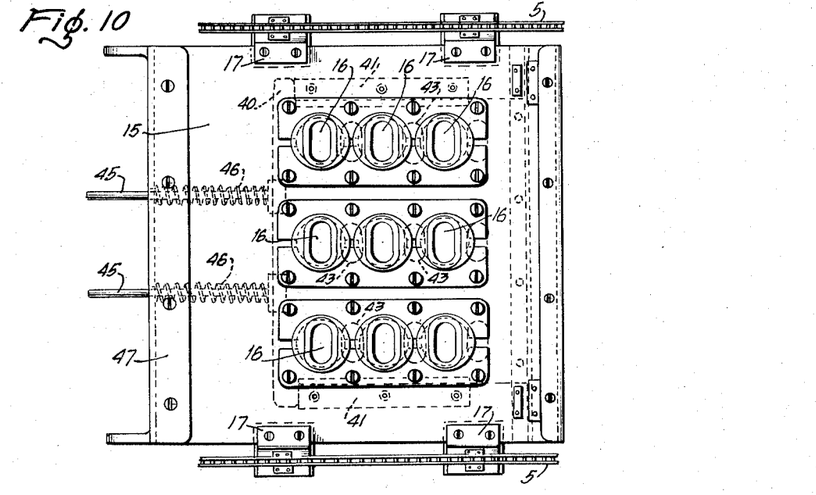
Fig. 10 is a plan view of the loading and carrying board which conveys the molding compound from the hopper to the heater and thence on to the molds and press.
Figure 14:
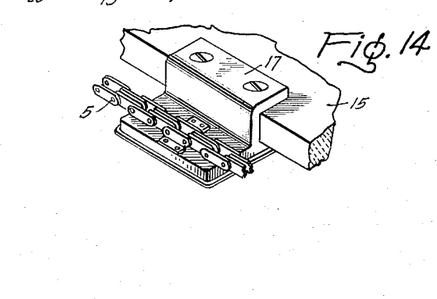
Fig. 14 is a fragmentary perspective view showing how the loading board is secured to endless chains which serve to carry it back and forth in the operation of the machine.

In order to hold the hopper 1 in close contact with the tops of the measuring units and yet allow it to be raised when the upper portions of the telescoping units 7, which are attached to the plate 8, are raised to increase their capacity, by adjusting the nuts 9, angles 10 are secured to the back and the front of the hopper through which pass the upright bolts 11 around which are the helical compression springs 12 which serve yieldingly to hold the hopper in contact with the cut-off plate 13 which can be moved to the right to cut off communication between the hopper and the measuring units 7, as will be later described. The measuring units 7 are normally closed at the bottom, as shown in Figs. 7, 8 and 9, by the plate 14 which may be moved to the right with plate 13 to open the bottoms of the units 7 after they are closed at the top by the movement of the plate 13. Beneath the hopper is a carrying board 15 having the cups 16 therein. The carrying board 15 is attached to each of the lower runs of the chains 5 by the means 17, best illustrated in Fig. 14.

In order to move the plate 13 to cut off communication between the hopper 1 and the units 7 and to move the plate 14 in order to effect a discharge of the compound in the units 7 into the cups 16, a compressed air cylinder 18 is provided having a piston 19 which is cooperatively connected to both the plates 13 and 14, as best shown in Fig. 8. Assuming the parts to be in the position shown in Figs. 7 and 8, when compressed air is admitted to the cylinder 18, through the tube 20, the piston 19 will be moved to the right and the openings in the bottom of the hopper 1, which communicate with the units 7, will be closed and the closures at the bottoms of the units 7 will be moved to the right so that the compound in the units 7 will fall by gravity into the cups 16 in the carrying board 15.

The motor which drives the chains is then started, as will be later explained, to drive the chains in a counter-clockwise direction which will move the carrying board, which is attached to the lower runs of said chains, with the cups therein toward and into the heating unit 2. The heating unit 2 is provided with gates 21 and 22 (see Fig. 1) which are actuated by compressed air introduced into the cylinders 23 and 24. When the motor is started to move the carrying board and the filled cups into the heating unit, both gates are opened, and closed, after the carrying board is within the heating unit 2. After the material has been heated to the proper degree the gates open and the motor starts to move the carrying board out of the heating unit and finally into a position where the cups 16 are disposed beneath the male plungers 25 of the press 3.

Between the heating unit 2 and the press 3 is a knock-out cart, represented generally by the numeral 27, which is picked up by the carrying board and moved along with it into a position directly under the male plungers 25 of the press. The carrying cart is provided with rollers 28 which run on the rails 29. The carrying cart carries a number of plungers 30 corresponding to the number of cups 16 in the carrying board and when the cart is picked up by the carrying board these plungers are centered over the cups. The plungers are moved downwardly by compressed air which is introduced through a flexible tube 31 into the tops of the cylinders 32 when the cups in the carrying board are immediately below the male plungers 25 in the press 3 and they force the molding compound therein into the female molds which are to be understood as supported in the press 3. After the compound has been forced out of the cups 16 into the female molds, the plungers 30 are retracted by introducing air into the cylinders 32 through the flexible hose 33.

After the plungers 30 have been retracted to the position shown in Fig. 1, the motor 4 is automatically reversed so that the lower runs of the chains are moved to the left moving the carrying board and the knock-out cart toward the left. When the knock-out cart reaches the position shown in Fig. 1, the forward rollers of the knock-out cart run over the projections 34, shown in Figs. 1, 3, 4, 5, 6, 11 and 12 until they are stopped by the projections 35.

Figure 11:
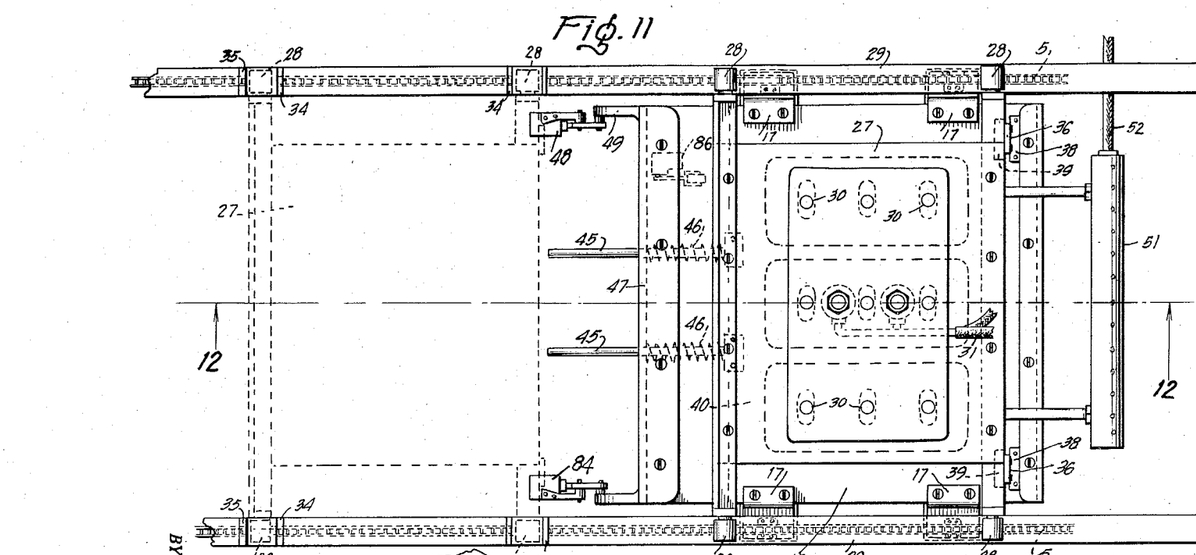
Fig. 11 is a plan view of the knock-out cart with the loading board directly underneath the cart and in its final position.
Figure 13:
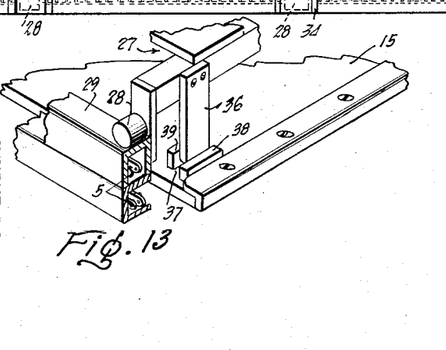
Fig. 13 is a fragmentary perspective view showing a section of the loading board making contact with the knock-out cart and forcing it from its neutral position.

Referring now more particularly to Figs. 11 and 13, when the rollers 28 on the knock-out cart ride up on the projections 34 and are stopped by the upstanding portions 35, the depending arms 36 rise out of the slots 37 between the blocks 38 and 39 on the carrying board 15 so that the board 15 is free to move back into its original position under the hopper 1 where the cups 16 are carried thereby are ready to be refilled. As soon as the knock-out cart is moved from beneath the male plungers 25 in the press 3 these plungers are depressed by compressed air and moved into the female members of the die to compress the moldable compound therein into the form of the finished product.

After the material is compressed, the plungers 25 are retracted and the apparatus is ready to begin the performance of a second cycle.

Figure 12:
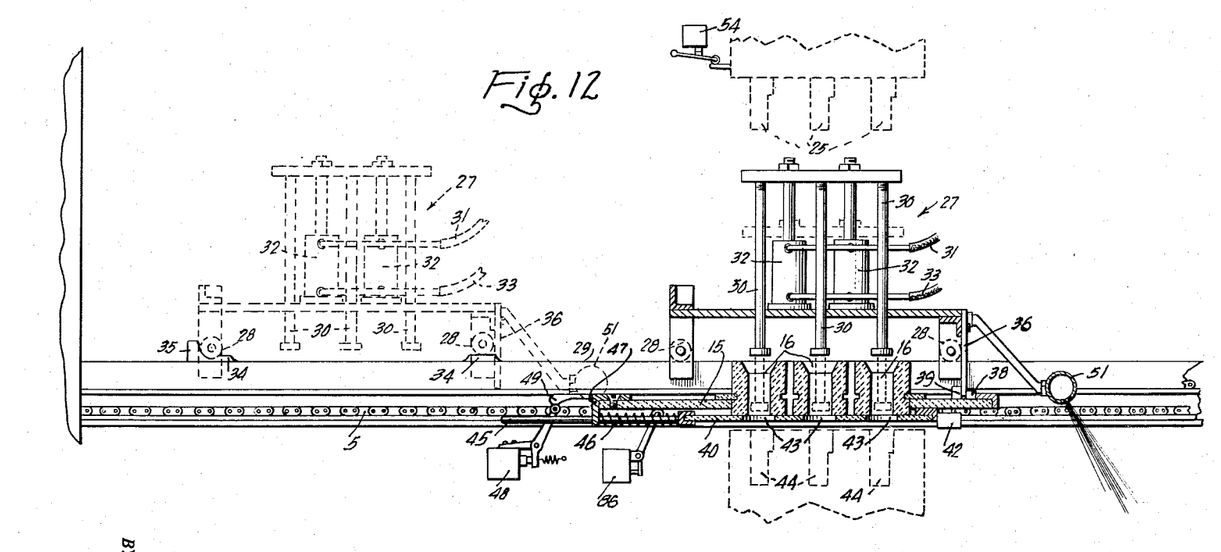
Fig. 12 is a section of Fig. 11 in the plane 12—12.

Referring now more particularly to Figs. 9, 11 and 12, the bottoms of the cups 16 when the moldable material is dumped therein are closed by the board 40 which rides with the carrying board on the angles 41 until it comes in contact with the stops 42 (see Fig. 12) whereupon its movement to the right is stopped while the carrying board with the cups thereon continues to move to the right until the openings 43 in the board 40 register with the bottoms of the openings in the cups 16 and thus allow the plungers 30, when they are depressed, to force the moldable compound out of the cups 16 into the female molds 44 (see Fig. 12). Secured to the plate 40 are two rods 45 surrounded by helical springs 46 which are compressed by the depending leg of the angle 47, which is attached to the carrying board 15, against the left hand end of the plate.

The movement of the plate 40 to the right is stopped by the stops 42 before the cups 16 in the carrying board 15 are in alignment with the openings in the plate 40 so that the springs 46 are compressed as the carrying board 15 moves to its final position, as shown in Fig. 12, after the movement to the right of the plate 40 has been stopped.

After the material in the cups 16 has been discharged into the female molds and the plungers 30 have been retracted, the motor 4 is reversed so that the lower runs of the chains to which the carrying board is attached move to the left taking with it the cups 16 and the knock-out cart 27. However, the springs 46 hold the plate, as shown in Fig. 12, until the bottoms of the cups are closed. When the knock-out cart reaches the position shown in the dotted outline in Fig. 12 it stops, but the carrying board continues to move until it, with the cups therein, are centered under the measuring units 7 and the device is ready for the following cycle of operation.

In Fig. 12 is a switch 48 which is normally open but which is closed by a cam 49 on the carrying board when the cups 16 are centered beneath the plungers 30 in order to open the valve which admits air to the cylinders 32 to actuate the plungers. It is also to be understood that in the heating chamber there is a normally closed switch 50 which is opened by the movement into said heating chamber of the carrying board with the cups thereon filled with the moldable compound to stop the motor and which also actuates the means controlling the operation of the gates 21 and 22 to close the same; all of which will be described in connection with the wiring and mechanical diagram in Fig. 2. The time within which the material remains in the heating chamber 2 is controlled as described in connection with Fig. 2 together with the opening of the gates, and the starting of the motor to move the carrying board and the cups toward the right.

Figure 2:
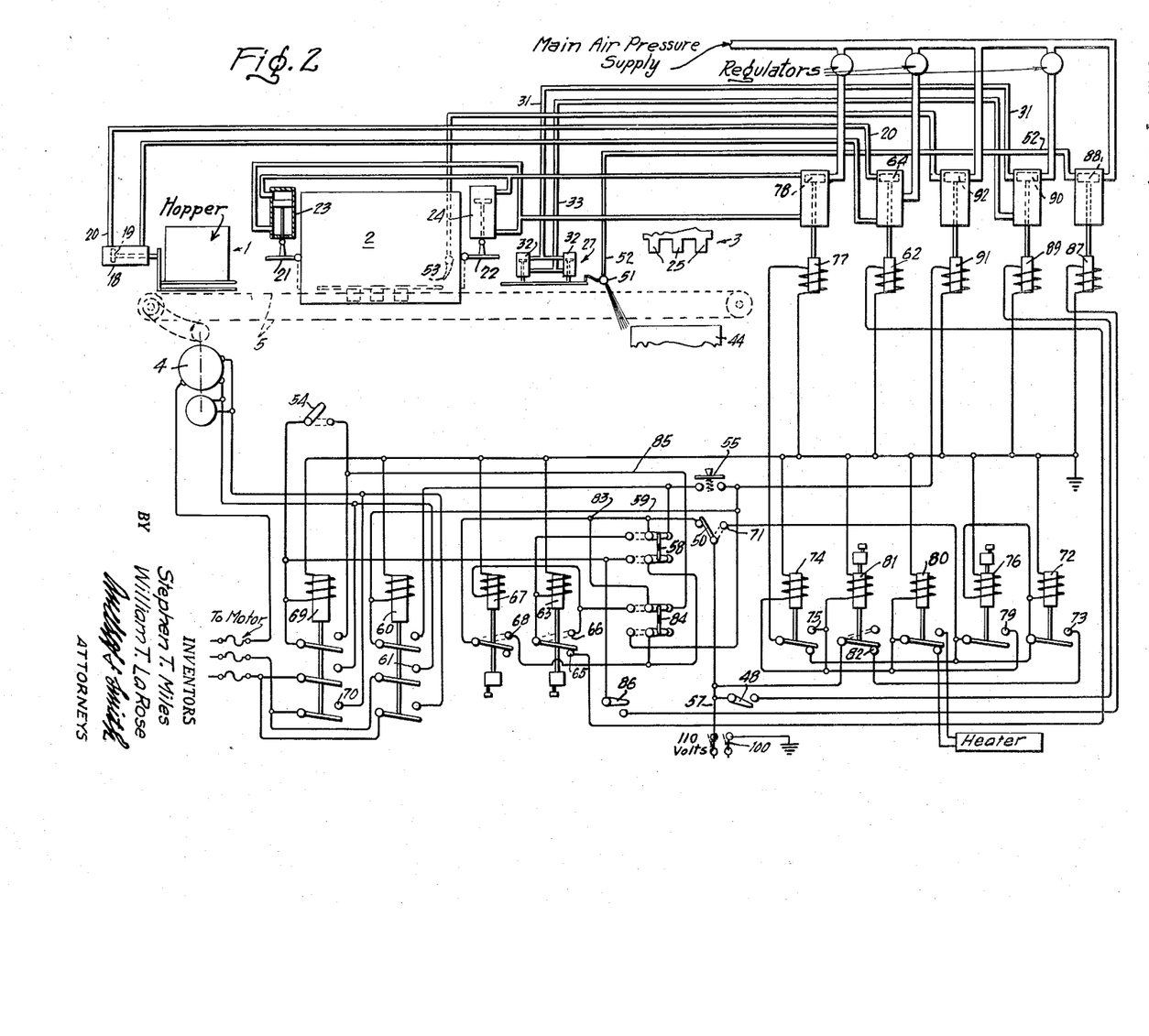
Fig. 2 is a schematic wiring and mechanical diagram showing how the various elements of our device are controlled and actuated.
Figure 3:
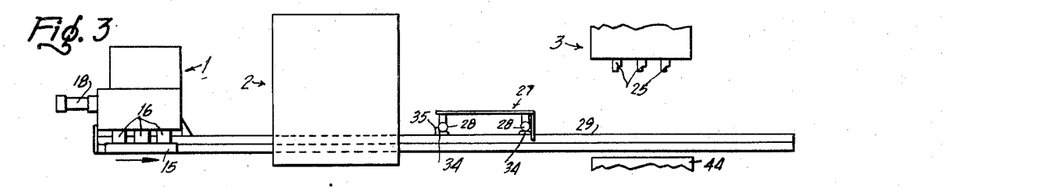
Figs. 3 to 6, inclusive, are purely diagrammatic illustrations of the operation of our device, with certain features omitted, showing a complete cycle.
Figure 4:
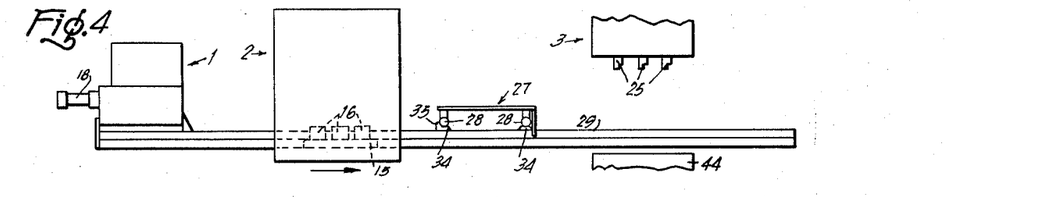
Figure 5:
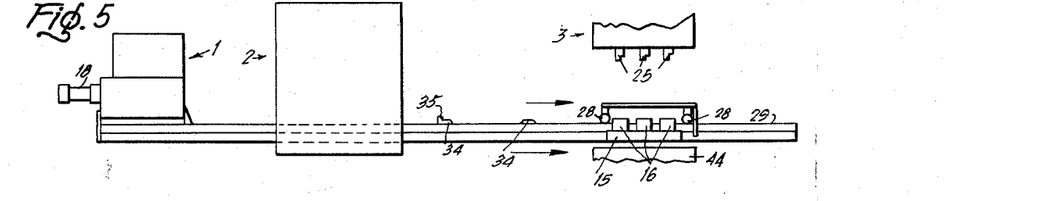
Figure 6:
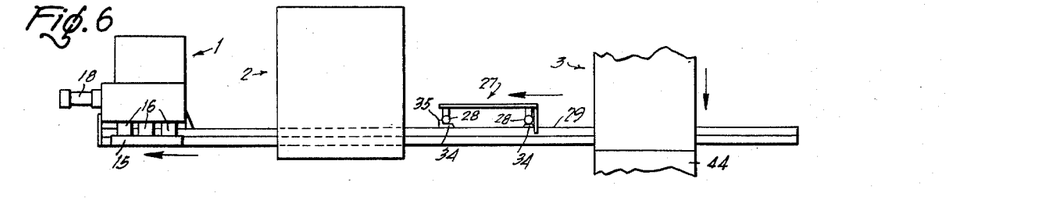

Referring to Figs. 11 and 12, there is secured to the knock-out car 27 an air nozzle 51 to which air is supplied by the flexible tube 52 which is put in operation by a solenoid, as explained in Fig. 2, to blow off any moldable material remaining on the female molds.

A second air blast for cleaning the top of the carrying board and the cups therein is provided, as shown in dotted outline at 53 in Figs. 1 and 2, and is actuated by a solenoid when the carrying board with the cups thereon is returning to its position beneath the hopper 1 to begin another cycle. At this time the male plungers have returned to their uppermost position, as shown in dotted outline in Fig. 12, and have closed the normally open switch 54 which will reverse the motor 4 to move the lower run of the chain to the right and repeat the cycle.

In operation, assuming that the carrying board is somewhere between the heating unit and the press on its way to the hopper and the machine is stopped, and referring particularly to Fig. 2, when the switch 55 is momentarily depressed, current will flow from power line 57 through switch 50, through reversing switch 58, across switch 55 through current line 59 causing contactor 60 to be energized.

When contactor 60 is energized, contact 61 will close, thereby causing motor 4 to rotate endless chains 5 in a clockwise direction. Carrier board 15 will continue to travel to the left without stopping in the heat chamber 2, because it stops only in heat chamber 2 when travelling to the right. This movement will be described later.

Assuming that carrier board 15 has traveled to the extreme left to receive a load of molding compound, at this extreme point the carrier board 15 trips reversing switch 58 into the position indicated in dotted lines.

When reversing switch 58 takes the position indicated in dotted lines, it will automatically energize solenoid 62 and load time relay 63. Load timer relay 63 will allow solenoid 62 the proper amount of time to operate main air piston 64 to transmit air under pressure through pipe 20 and compress piston 19, thereby allowing the molding compound to be dropped into the cups 16, which are mounted on the carrier board 15.

Assuming now, the load timer relay 63 has been given the proper amount of time, it will then open contact 65 and close contact 66. When contact 66 is closed, pause timer relay 67 is energized, thus allowing solenoid 62 enough time for piston 19 and main air piston 64 to go back to their normal positions.

After the pause timer relay 67 has been given the proper amount of time, contact 68 will be closed, thereby energizing contactor 69 through reversing switch 58. This will close contact 70, causing motor 4 to drive the chain in a counter-clockwise direction, or the bottom run thereof to the right, until the carrier board 15 has reached its proper position in the heat chamber 2. When carrier board 15 engages the switch 50 in the heating chamber it allows contact 71 to be closed momentarily. This will deenergize contactor 69 and stop motor 4. The closing of contact 71 will energize hold relay 72 and cause contact 73 to be closed and also energize gate relay 74, thereby closing contact 75.

Delay time relay 76 will also be energized and begin its time delay. Solenoid 77 will be energized to allow gates 21 and 22 to be closed by main piston 78, admitting air pressure to the top of the pistons in cylinders 23 and 24.

Now, assuming that delay time relay 76 has completed its proper time, it will close its contact 79. In doing so, this will energize the heater supply relay 80 and the proper amount of heat will be supplied to the molding compound. Main timer relay 81 will also be energized but will not break contact 82 until the proper time has run out.

Assuming that the time has run out, contact 82 will break, gates 21 and 22 will open, the heater will discontinue to supply heat, and holding relay 72 will go back to its normal position. At this time, male plungers 25 will have reached their upper positions, thereby closing switch 54. This will energize contactor 69, starting the motor 4 to move carrier board 15 again to the right. To accomplish this movement again, current is supplied through terminal 83, reversing switch 84, and line 85 to switch 54.

Carrier board 15 will continue to travel right and come into contact with the knock-out cart 27 and mold blast 51 which will be picked up by and carried along with board 15. On its travel, mold blast 52 will close a switch 86 and energize solenoid 87, thus allowing piston 88 to move down and transmit compressed air through line 52 to mold blast 51 which will clean the female molds 44 and prepare for a discharge of molding compound into said molds. This air blast will continue until the carrier board 15 has reached its extreme travel to the right and trips reversing switch 84 into its dotted position. Contactor 69 will be de-energized, and switch 86 and solenoid 87 will also drop out.

By closing this reversing switch 84, as shown in dotted position, pause timer 67 will be energized, switch 48 will close to energize solenoid 89, and lower piston 90 to allow compressed air to flow through pipe 31 and force the pistons in cylinders 32 down; thereby ejecting the molding compound into the female molds 44.

Let us now assume that pause timer 67 has run out and contact 68 is made. Contactor 69 is energized, solenoid 91 is also energized, thereby supplying air to top of piston 92, causing compressed air to flow out jet 53 in the heating chamber, which will clean the carrier board 15 while passing through the heating unit, and after carrier board 15 has returned knock-out cart 27 and mold blast 51 to its neutral position.

The carrier board 15 has also opened switch 48, and reversing switch 84, and the pistons in cylinders 32 will go back to their upper positions because solenoid 89 will be deenergized. This completes a cycle.

From the foregoing it should be apparent that once our machine has been started and the hopper is kept supplied with molding compound, it will function automatically to mold batch after batch of articles until it is stopped by opening the main switch 100.

No means has been shown in knocking the molded articles out of the molds because devices of this order are well known in the art. In any event, empty molds may be placed in the press when the ones containing the molded articles are removed.

While we have described our molding compound as being in the form of particles, it is to be understood that the term particles is intended to include the compound in any form which will flow freely from the hopper into the measuring units and into the carrying cups.

While we have described our invention in its preferred embodiment, it is to be understood that the words which we have used are words of description rather than of limitation and that changes, within the purview of the appended claims, may be made without departing from the true scope and spirit of our invention in its broader aspects.

What we claim is:

1. In a device for molding articles from a plastic material, the combination with a hopper adapted to contain a supply of said material in the form of fine particles; of a molding press disposed in spaced relation to said hopper and adapted to support a mold therein; means forming a material heating chamber between said hopper and press; means for conveying said material from said hopper through said heating unit to said press; means for automatically stopping said conveying means in said heating chamber on its passage toward said press; means for starting said conveying means, after the material carried thereby has been heated in said chamber to molding temperature, to carry said material to said press; means normally positioned between said heating unit and said press for effecting a discharge of the heated material in said conveying means into a mold in said press; means on said discharge effecting means and means on said conveying means cooperating therewith to convey said discharge effecting means into said press; means for automatically reversing the direction of movement of said conveying means, after the heated material therein is discharged into said mold, for moving said conveying means and said means for discharging said heated material into said mold back to their initial positions; and means for automatically effecting a repetition of the operations aforesaid.

2. In a machine for automatically and successively molding a plurality of articles from particles of a molding compound; a hopper adapted to contain a supply of said particles; a plurality of measuring units beneath said hopper into which said particles may flow by gravity; means for varying the capacity of said units in accordance with the volume of particles required to mold each of said articles; a press in laterally spaced relation to said hopper and comprising a plurality of plungers and means in said press beneath said plungers adapted to support a plurality of molds in vertical alignment therewith; means forming a particle heating chamber between said hopper and press and provided with heating means; a normally open gate on said chamber adjacent said hopper and one adjacent said press; a pair of chains, one on each side of said machine, extending from said hopper to said press; a reversible motor for driving said chains; a plurality of particle-carrying cups and a carrier for said cups secured to each of said chains for conveying said carrier and cups between a position beneath said measuring units to receive the particles discharged therefrom and a position over the molds supported in said press to discharge said particles into said molds; means for knocking the particles of said compound out of said cups into said molds and comprising a cart, normally positioned between said heating chamber and said press, and carrying a plurality of plungers; means on said cart cooperating with said carrier for conveying said cart from its normal position to a position with its plungers directly over said molds, when said cups are over said molds, and back to its normal position; means actuated by compressed air for operating said plungers to force the particles in said cups into said molds and withdrawing said plungers from said cups; means automatically starting said motor when said cups are filled to convey said carrier and cups into said heating chamber; means automatically actuated when said carrier is in said heating chamber for stopping said motor, closing said normally open gates and activating said heating means; means automatically actuated when said particles of compound have been heated to the required degree, for deactivating said heating means, opening said gates, and starting said motor to move said carrier into said press, and stopping said motor when said cups are over the molds in said press; means automatically actuated, after said particles are discharged into said molds, for reversing said motor to convey said cups back to their position beneath said measuring units and said cart back to its normal position to repeat the operations aforesaid.

References Cited in the file of this patent

UNITED STATES PATENTS

| | | |
|---|---|---|
| 2,325,119 | Flowers | July 27, 1943 |
| 2,380,084 | Strauss | July 10, 1945 |
| 2,467,440 | Meharg et al. | Apr. 19, 1949 |

FOREIGN PATENTS

| | | |
|---|---|---|
| 158,028 | Australia | Aug. 3, 1954 |